United States Patent
Kawata et al.

(10) Patent No.: US 12,520,451 B2
(45) Date of Patent: Jan. 6, 2026

(54) COOLING UNIT INCLUDING MANIFOLDS, AN AIR BLOWER, AND A RADIATOR

(71) Applicant: Nidec Corporation, Kyoto (JP)

(72) Inventors: Keisuke Kawata, Kyoto (JP);
Toshihiko Tokeshi, Kyoto (JP);
Takehito Tamaoka, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 238 days.

(21) Appl. No.: 18/202,322

(22) Filed: May 26, 2023

(65) Prior Publication Data

US 2023/0389228 A1    Nov. 30, 2023

(30) Foreign Application Priority Data

May 27, 2022    (JP) .................. 2022-087047

(51) Int. Cl.
*G06F 1/20* (2006.01)
*H05K 7/20* (2006.01)

(52) U.S. Cl.
CPC ........... *H05K 7/20272* (2013.01); *G06F 1/20* (2013.01); *H05K 7/20254* (2013.01); *H05K 7/20263* (2013.01)

(58) Field of Classification Search
CPC ..................................... G06F 1/20
See application file for complete search history.

(56) References Cited

U.S. PATENT DOCUMENTS

| 6,785,142 | B1* | 8/2004 | Regimbal | H05K 7/1498 |
| | | | | 174/16.3 |
| 9,101,079 | B2* | 8/2015 | Aoki | H01L 23/467 |
| 11,582,886 | B2* | 2/2023 | Gao | H05K 7/20718 |
| 2014/0211531 | A1* | 7/2014 | Yamashita | B61C 3/00 |
| | | | | 363/141 |
| 2023/0164948 | A1* | 5/2023 | Weltsch | G06F 1/206 |
| | | | | 165/80.4 |

* cited by examiner

*Primary Examiner* — Zachary Pape
(74) *Attorney, Agent, or Firm* — Keating & Bennett, LLP (57) ABSTRACT

A cooling assembly is connectable with a cold plate that comes into thermal contact with a heat source, and includes a first manifold, a second manifold, and a radiator. The first manifold causes a refrigerant having circulated through a first pipe to flow out from outflow ports toward the cold plate. In the second manifold, the refrigerant flowing into inflow ports from the cold plate circulates through a second pipe. In the radiator, the refrigerant having circulated through the second pipe circulates through the flow paths arranged side by side at intervals. Each of the first and second pipes opposes a portion of the radiator in the first direction.

7 Claims, 7 Drawing Sheets

COOLING UNIT INCLUDING MANIFOLDS, AN AIR BLOWER, AND A RADIATOR

CROSS-REFERENCE TO RELATED APPLICATIONS

The present disclosure claims priority under 35 U.S.C. § 119 to Japanese Patent Application No. 2022-087047, filed on May 27, 2022, the entire contents of which are hereby incorporated herein by reference.

1. FIELD OF THE INVENTION

The present disclosure relates to a cooling assembly.

2. BACKGROUND

Conventionally, a cooling device is known. Inside the housing of the cooling device is provided with an electrolytic capacitor as a heat source, a power semiconductor module, and a printed circuit board. When the heat source operates, the ambient temperature rises. The cooling device cools air in the housing. In the cooling device, air is circulated by a micro fan. The heat of air is collected by an air cooling fin of the cooling device and then transferred to a cooling body by a heat pipe. The cooling body has an intake port and an ejection port. One cooling pipe is connected to each of the intake port and the ejection port. A low-temperature refrigerant flows into the cooling body from the intake port through the cooling pipe. The heat transferred from the heat pipe moves to the refrigerant in the cooling body. Thereafter, the high-temperature refrigerant flows out of the cooling device from the ejection port. Due to this, the heat in electronic equipment is carried out to the outside of the electronic equipment.

Conventionally, two cooling pipes are connected to each of a plurality of cooling bodies. Therefore, depending on the routing of a large number of cooling pipes, the cooling device becomes large in size, but specific routing of each cooling pipe is not known.

Conventionally, the optimum arrangement and the like of built-in components for efficiently circulating air by the micro fan are not considered at all.

SUMMARY

A cooling assembly according to an example embodiment of the present disclosure is connectable with a cold plate that comes into thermal contact with a heat source. The cooling assembly includes a first manifold, a second manifold, a radiator, and an air blower assembly. The first manifold includes a first pipe and a plurality of outflow ports. The first manifold causes the refrigerant having circulated through the first pipe to flow out from the plurality of outflow ports toward the cold plate. The second manifold includes a plurality of inflow ports and a second pipe. In the second manifold, the refrigerant having flowed from the cold plate into the plurality of inflow ports circulates through the second pipe. The radiator includes a plurality of flow paths arranged side by side at intervals. In the radiator, the refrigerant having circulated through the second pipe circulates through the plurality of flow paths. The air blower assembly generates an airflow flowing between the plurality of flow paths in a first direction perpendicular or substantially perpendicular to the plurality of flow paths. Each of the first pipe and the second pipe opposes a portion of the radiator in the first direction.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. In the drawings, the same or corresponding elements or features are denoted by the same reference numerals, and the description will not be repeated.

Figure 1:
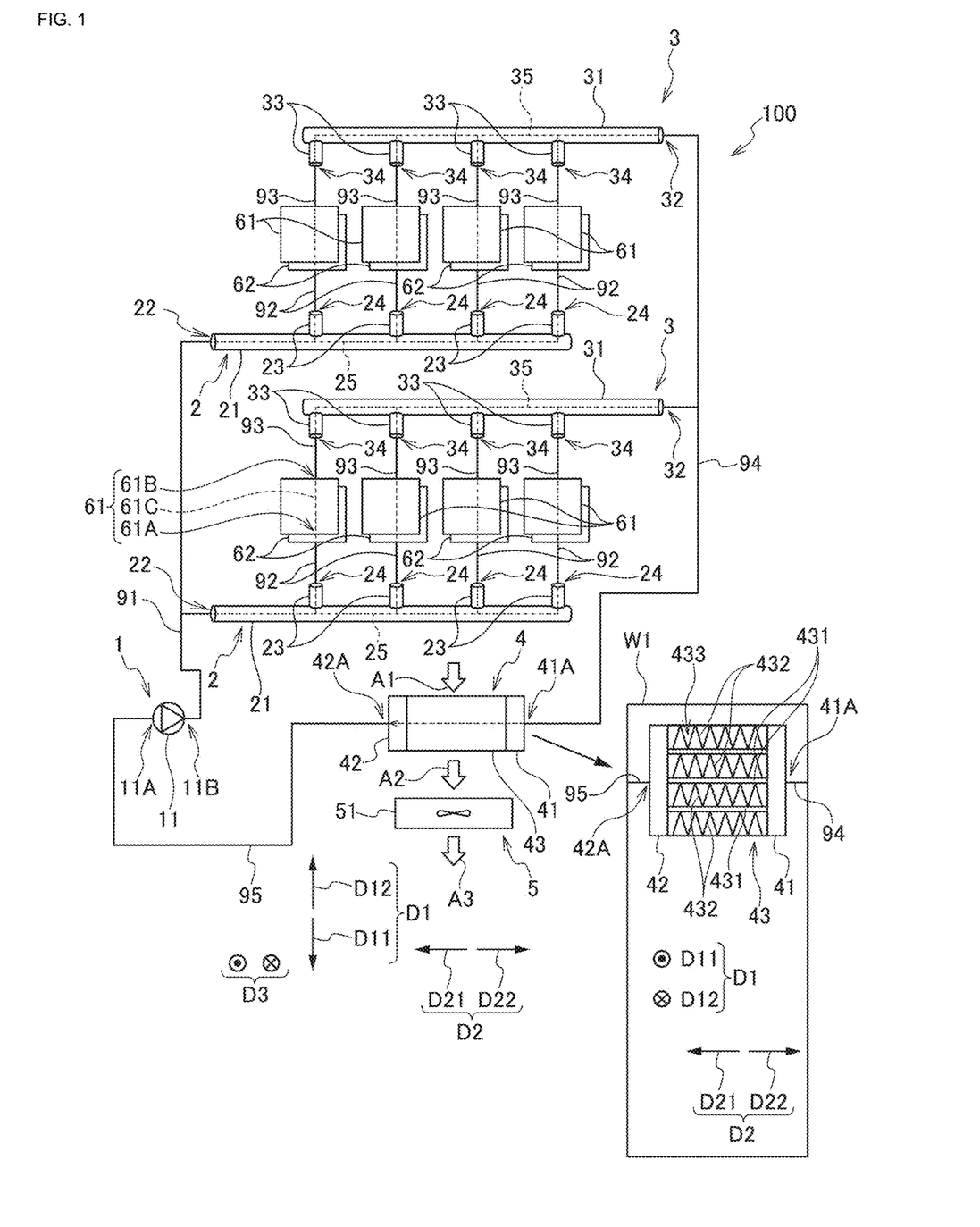
FIG. 1 is a view showing a refrigerant circuit in a cooling assembly according to an example embodiment of the present disclosure.

FIG. 1 is a view showing a refrigerant circuit in a cooling assembly 100 according to an example embodiment of the present disclosure. As shown in FIG. 1, the cooling assembly 100 includes a pump unit 1, two first manifolds 2, two second manifolds 3, a radiator 4, and an air blower assembly 5.

The present description appropriately describes a first direction D1, a second direction D2, and a third direction D3 orthogonal to one another for easy understanding. The first direction D1 is a direction orthogonal to a plurality of flow paths 431 (see inside a frame W1) in the radiator 4. The second direction D2 is a direction orthogonal to the first direction D1. Specifically, the second direction D2 is a direction in which each flow path 431 extends.

One side in the first direction D1 is referred to as one side D11 in the first direction, and the other side in the first direction D1 is referred to as other side D12 in the first direction. The one side D11 in the first direction is a direction in which air flows between the plurality of flow paths 431 in the radiator 4. One side in the second direction D2 is referred to as one side D21 in the second direction, and the other side in the second direction D2 is referred to as other side D22 in the second direction. The one side D21 in the second direction is a direction in which the refrigerant flows in the plurality of flow paths 431. One side in the third direction D3 is referred to as one side D31 in the third direction, and the other side in the third direction D3 is referred to as other side D32 in the third direction. However, the directions are defined merely for convenience of explanation, and the orientations of the exemplary cold plate of the present disclosure in use are not limited unless the horizontal direction and the vertical direction need to be defined in particular. In the present description, the "orthogonal direction" includes a substantially orthogonal direction.

The pump unit 1 includes three pump units 11. Each of the pump units 11 has, for example, two centrifugal pumps. However, each of the pump units 11 may have another type of pumps that are not limited to the centrifugal pumps. Each of the pump units 11 includes a suction port 11A, a discharge port 11B, and an impeller (not shown). By rotation of the impeller included in the pump unit itself, each of the pump units 11 sucks the refrigerant flowing out of the radiator 4 through the suction port 11A and discharges the sucked refrigerant through the discharge port 11B. The refrigerant is a coolant. Examples of the coolant include antifreeze liquid and pure water. A typical example of the antifreeze liquid is an ethylene glycol aqueous solution or a propylene glycol aqueous solution.

Each of the first manifolds 2 includes a first pipe 21, an inflow port 22, a plurality of outlet pipes 23, a plurality of outflow ports 24, and a flow path 25. The first pipe 21 is a pipe-shaped member extending in the second direction D2. The inflow port 22 is formed at an end of the first pipe 21 on the one side D21 in the second direction. The end of the first pipe 21 on the other side D22 in the second direction is closed. The inflow port 22 is connected to each discharge port 11B via a flow path 91. The flow path 91 allows the refrigerant to circulate from each discharge port 11B to the inflow port 22. Each of the outlet pipes 23 protrudes from a peripheral surface of the first pipe 21 and extends along the first direction D1. The plurality of outlet pipes 23 are arranged at intervals in the second direction D2. One outflow port 24 is formed at the tip of each of the outlet pipes 23. A plurality of the flow paths 25 connect the inflow port 22 and the plurality of outflow ports 24 so that the refrigerant can circulate therethrough. Each of the first manifolds 2 is made of a hard material. The hard material is metal or resin.

The refrigerant discharged from the pump unit 1 flows into the first pipe 21 from each inflow port 22 through the flow path 91. The refrigerant circulates through the flow path 25 in the first pipe 21 and each of the outlet pipes 23, and flows out from the plurality of outflow ports 24. The plurality of outflow ports 24 are connected to a plurality of cold plates 61 by a plurality of flow paths 92. The plurality of flow paths 92 allow the refrigerant to circulate from the plurality of outflow ports 24 to the plurality of cold plates 61. That is, each of the first manifolds 2 causes the refrigerant to flow out from the plurality of outflow ports 24 toward the plurality of cold plates 61.

At least one heat source 62 comes into thermal contact with each of the cold plates 61. Therefore, the cooling assembly 100 is connectable with the cold plate 61 in thermal contact with each heat source 62. Each heat source 62 is a component of a computer device. The operation of the computer device causes each heat source 62 to generate heat. Each heat source 62 is, for example, any of an electrolytic capacitor, a power semiconductor module, and a printed circuit board. Specifically, the cold plate 61 comes into contact with an outer surface of the heat source 62 directly or via a thermally conductive material. The thermally conductive material is silicon or heat conductive grease.

Each of the cold plates 61 includes an inflow port 61A, an outflow port 61B, and a flow path 61C. In FIG. 1, for convenience, reference numerals "61A", "61B", and "61C" are given to only one cold plate 61. The refrigerant flows into each inflow port 61A from the flow path 92 connected thereto. The refrigerant circulates in the flow path 61C from the inflow port 61A to the outflow port 61B. Therefore, the heat generated by the heat source 62 moves to the refrigerant circulating through the flow path 61C. Thereafter, the refrigerant flows out from the outflow port 61B.

Each of the second manifolds 3 includes a second pipe 31, an outflow port 32, a plurality of inlet pipes 33, a plurality of inflow ports 34, and a flow path 35. The second pipe 31 is a tubular member extending in the second direction D2. The end of the second pipe 31 on the one side D21 in the second direction is closed. The outflow port 32 is formed at an end of the second pipe 31 on the other side D22 in the second direction. The plurality of inlet pipes 33 protrude from a peripheral surface of the second pipe 31 and extends along the first direction D1. The plurality of inlet pipes 33 are arranged at intervals in the second direction D2. One inflow port 34 is formed at the tip of each of the inlet pipes 33. The plurality of inflow ports 34 are connected to the outflow ports 61B of the plurality of cold plates 61 via a plurality of flow paths 93. The plurality of flow paths 93 allow the refrigerant to circulate from the plurality of outflow ports 61B to the plurality of inflow ports 34. A plurality of the flow paths 35 connect the plurality of inflow ports 34 and the outflow port 32 so that the refrigerant can circulate therethrough. Each of the second manifolds 3 is only required to be made of a hard material similar to that of the first manifold 2.

The refrigerant flowing out of the plurality of outflow ports 61B flows into the second pipe 31 from the plurality of inflow ports 34 through the plurality of flow paths 93. The refrigerant circulates through the flow path 35 in each second pipe 31. Therefore, in the plurality of second manifolds 3, the refrigerant flowing from the plurality of cold plates 61 into the plurality of inflow ports 34 circulates through the second pipe 31. Thereafter, the refrigerant flows out from each outflow port 32.

The radiator 4 includes a first tank 41, a second tank 42, and a radiator core 43.

The first tank 41 and the second tank 42 are arranged at a distance in the second direction D2. Each of the first tank 41 and the second tank 42 has a substantially rectangular cuboid shape. The first tank 41 includes an inflow port 41A. The inflow port 41A is connected to the outflow port 32 of each of the second manifolds 3 via a plurality of flow paths 94. The plurality of flow paths 94 allow the refrigerant to circulate from the plurality of outflow ports 32 to the inflow port 41A. The second tank 42 includes an outflow port 42A. The outflow port 42A is connected to each suction port 11A of the pump unit 1 via a flow path 95. The flow path 95 allows the refrigerant to circulate from the outflow port 42A to each suction port 11A.

The radiator core 43 is positioned between the first tank 41 and the second tank 42. As shown in the frame W1 of FIG. 1, the radiator core 43 has a substantially rectangular outer shape as viewed from the first direction D1. The radiator core 43 includes the plurality of flow paths 431 and a plurality of fins 432. Each of the plurality of flow paths 431 extends from the first tank 41 to the second tank 42 along the second direction D2. Each of the plurality of flow paths 431 is connected to each of the first tank 41 and the second tank 42 so that the refrigerant can circulate therethrough. The plurality of flow paths 431 are arranged at intervals in the third direction D3 (see inside of the frame W1, in particular). Each of the plurality of fins 432 is formed in a wave shape with a thin metal plate or the like. Each of the plurality of fins 432 is in thermal contact with the plurality of flow paths 431. Each of the fins 432 having the wave shape and each of the flow paths 431 form a ventilation path 433 extending in the first direction D1. In FIG. 1, only a single ventilation path is given reference numeral "433". A plurality of the ventilation paths 433 allow air to flow between the plurality of flow paths 431 to the one side D11 in the first direction.

The refrigerant flowing out of each outflow port 32 flows into the first tank 41 from the inflow port 41A, and is temporarily stored in the first tank 41. Next, the refrigerant flows out from the first tank 41 to the plurality of flow paths 431. Next, the refrigerant circulates through the plurality of flow paths 431 before flowing into the second tank 42. Next, the refrigerant flows out from the outflow port 42A of the second tank 42 into the flow path 95. Furthermore, the refrigerant circulates through the flow path 95 before being sucked from the suction port 11A of the pump unit 1.

The air blower assembly 5 includes five fan units 51. Each of the fan units 51 includes two axial fans. Each axial fan includes an impeller. The air blower assembly 5 generates an airflow flowing along the ventilation path 433 between the plurality of flow paths 431 by rotation of each impeller. In FIG. 1, the airflow is schematically indicated by arrows A1 to A3. This airflow cools the refrigerant flowing in the plurality of flow paths 431 of the radiator 4.

Figure 2:
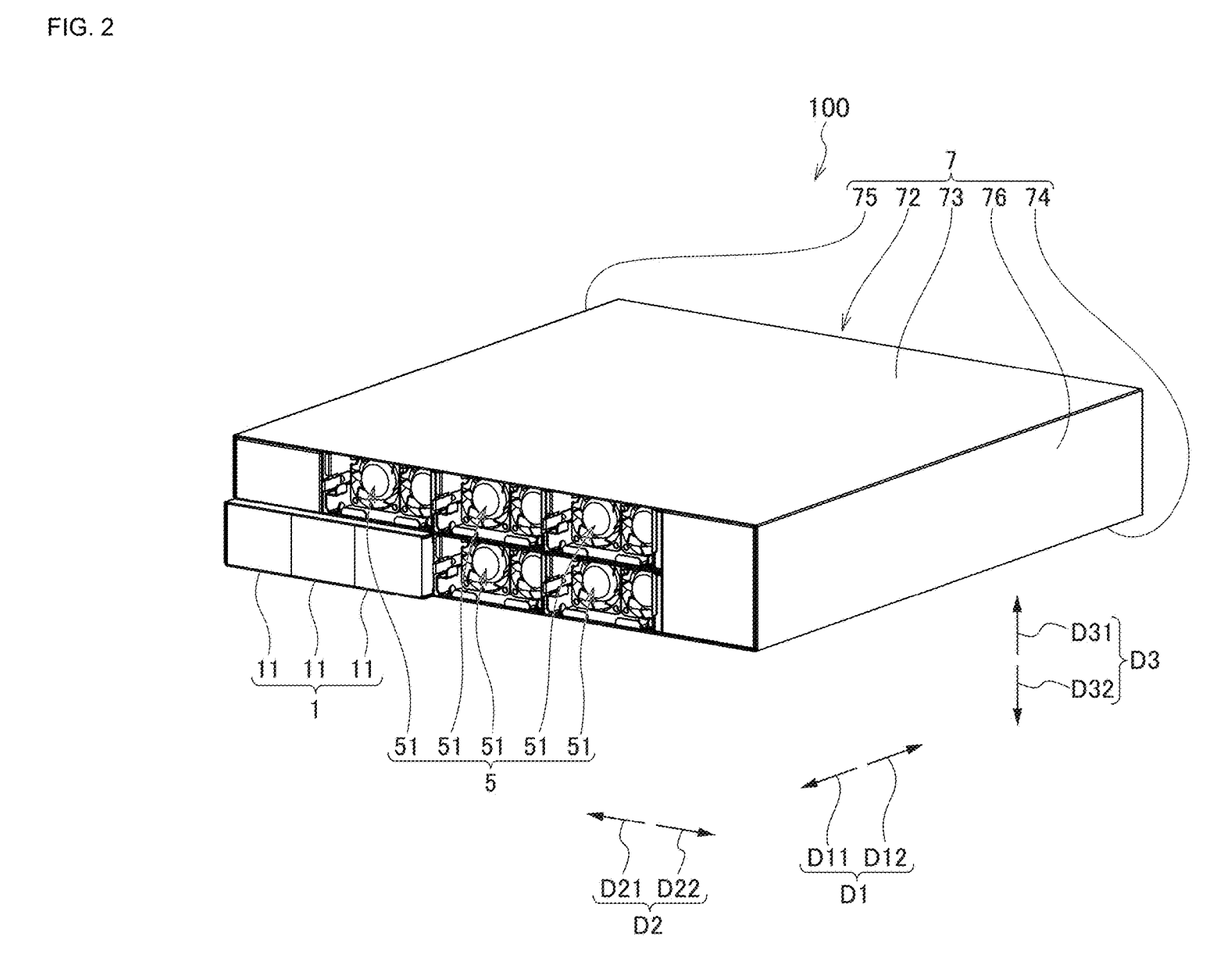
FIG. 2 is a perspective view showing an appearance of the cooling assembly shown in FIG. 1.
Figure 3:
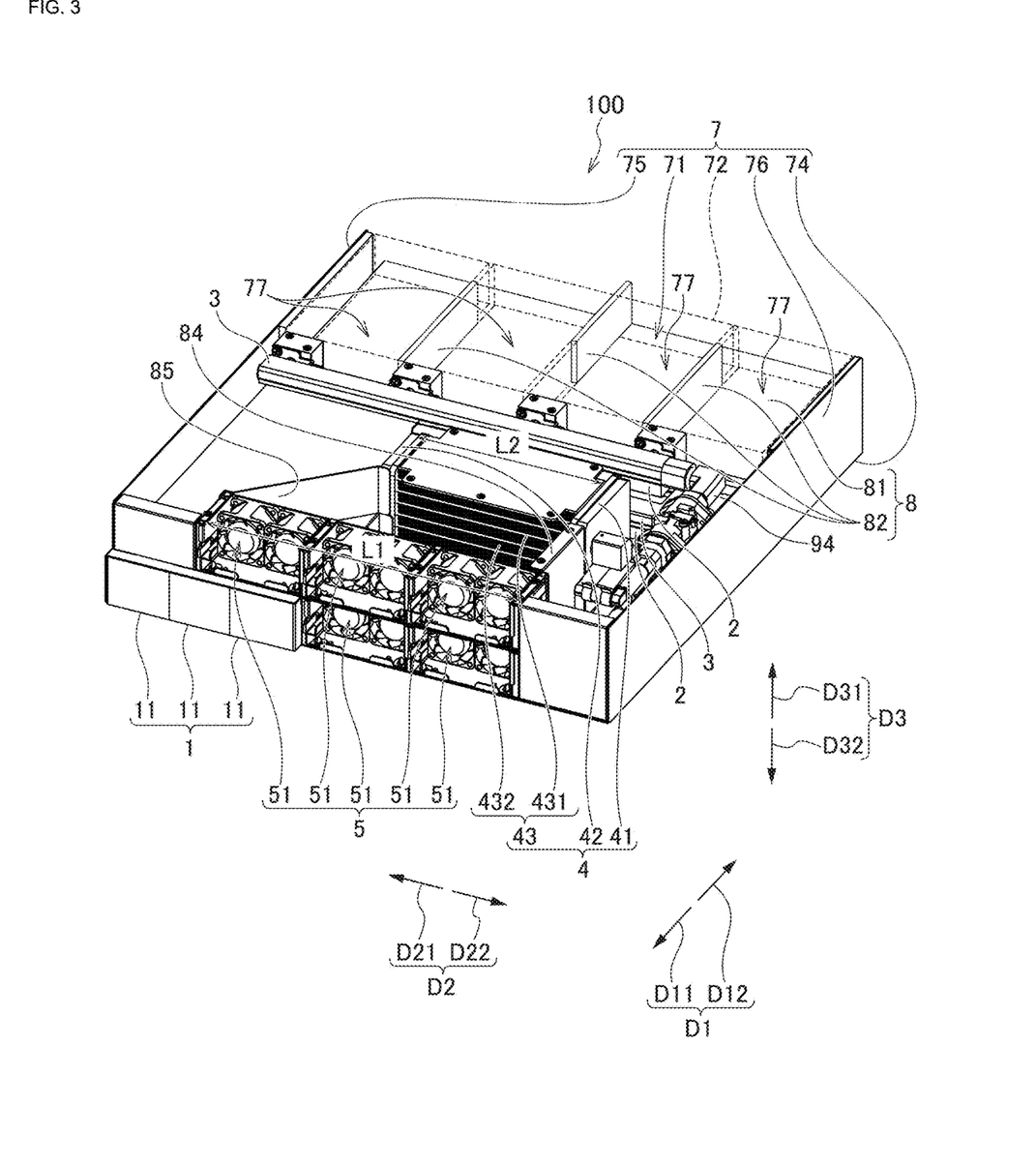
FIG. 3 is a perspective view showing an internal configuration of the cooling assembly shown in FIG. 2.
Figure 4:
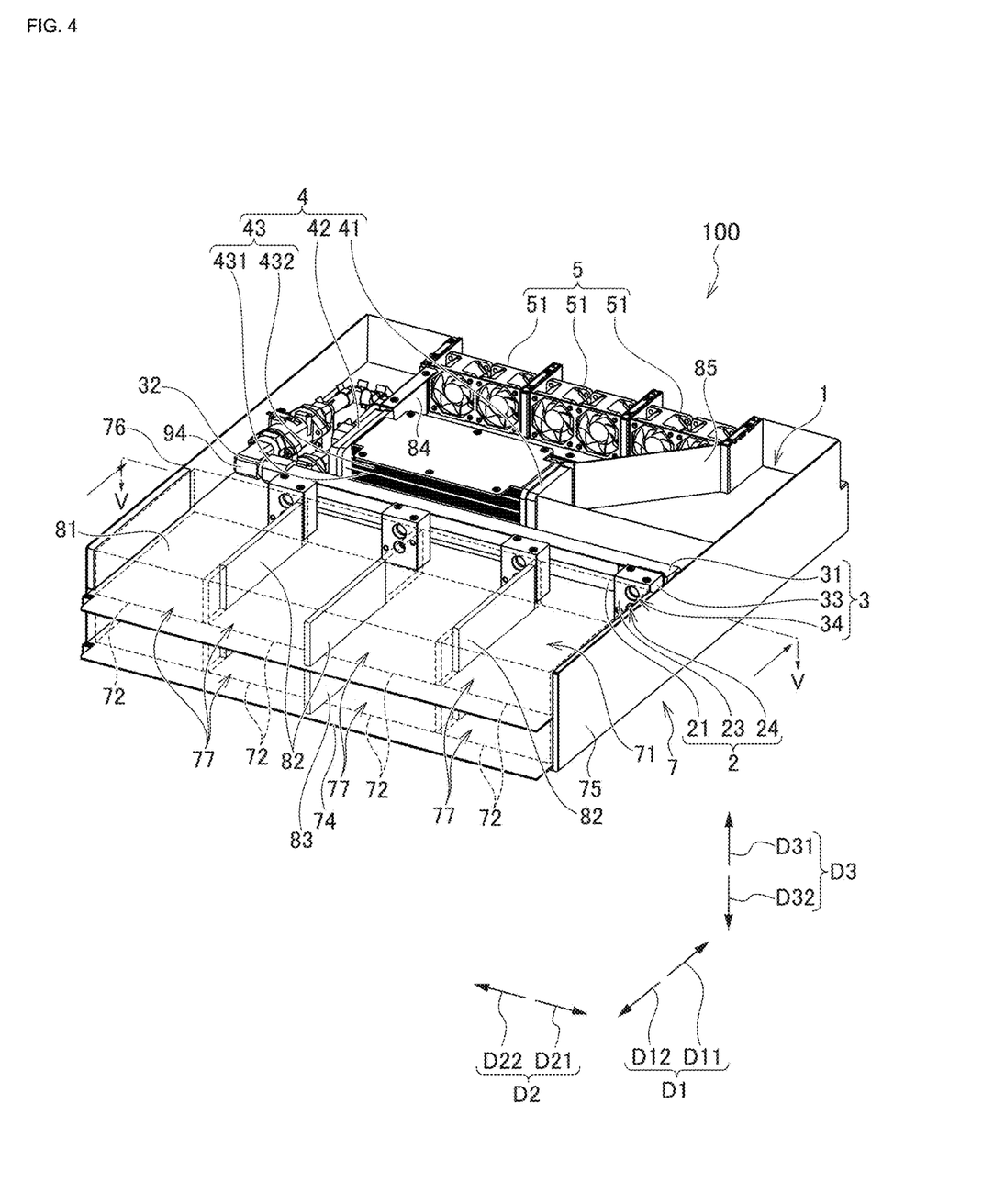
FIG. 4 is a perspective view of an internal configuration of the cooling assembly shown in FIG. 3 as viewed from a viewing direction different from that of FIG. 3.
Figure 5:
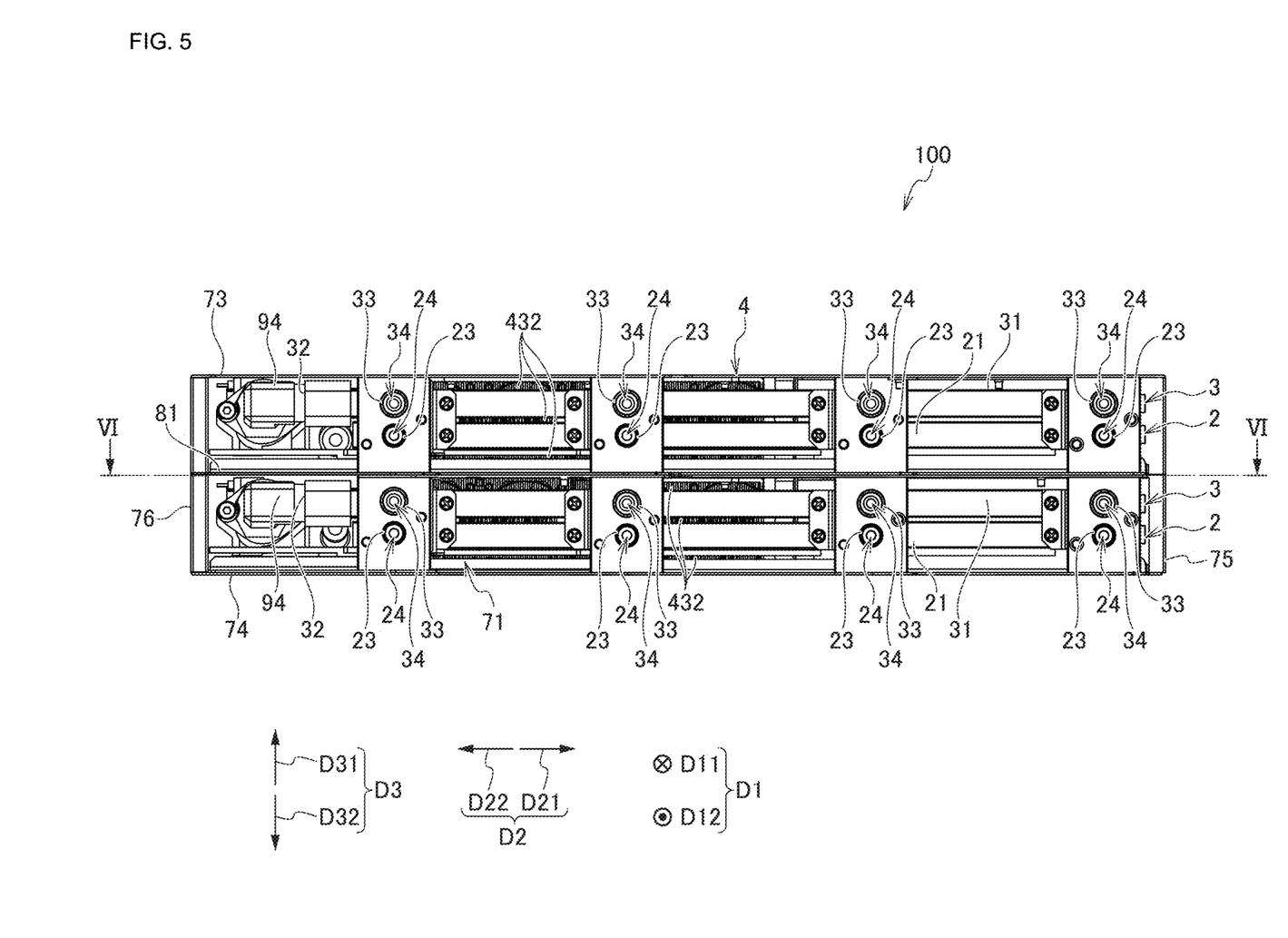
FIG. 5 is a longitudinal sectional view of the cooling assembly taken along line V-V shown in FIG. 4.
Figure 6:
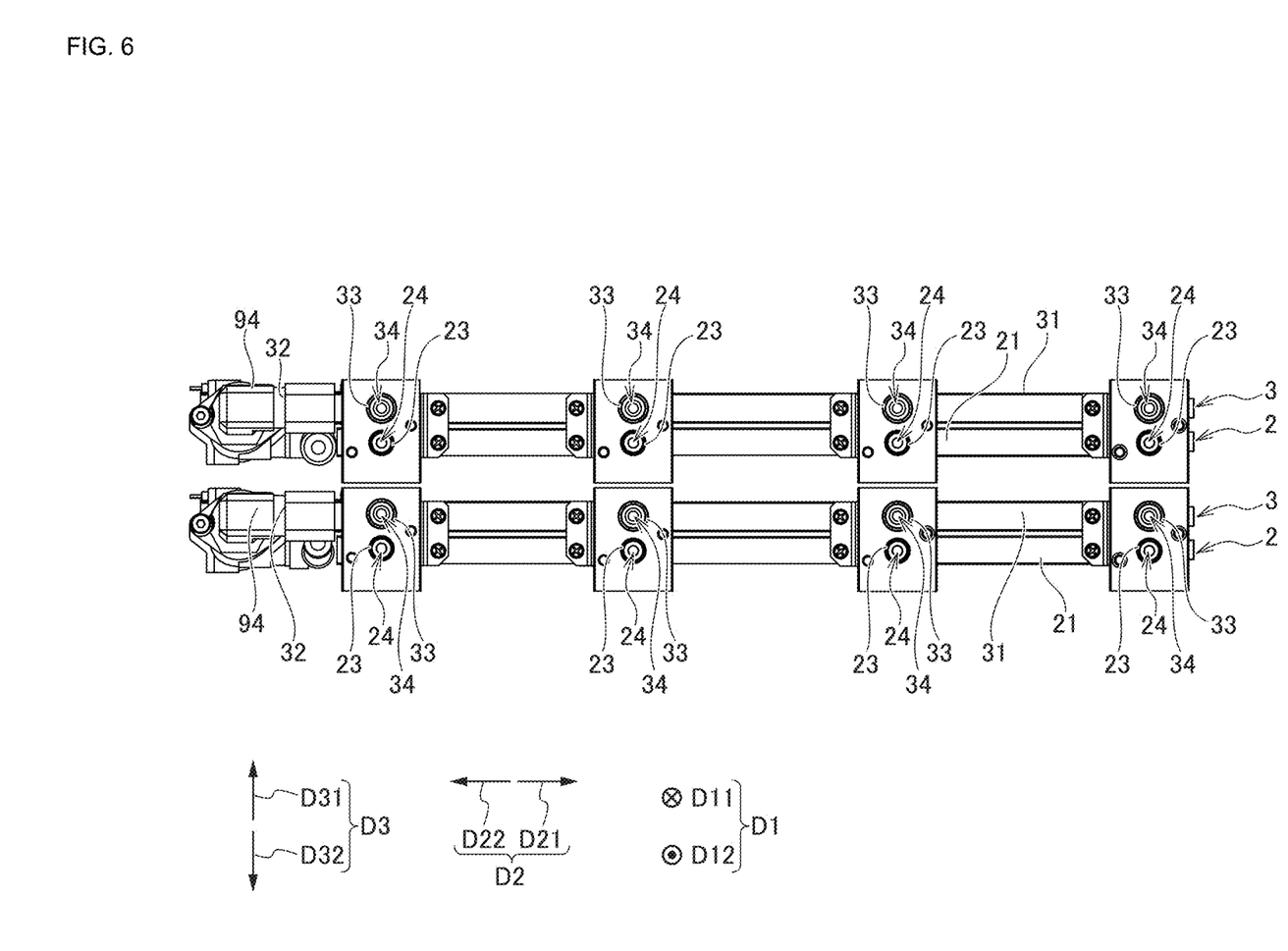
FIG. 6 is a view showing a first manifold 2 and a second manifold 3 shown in FIG. 5.
Figure 7:
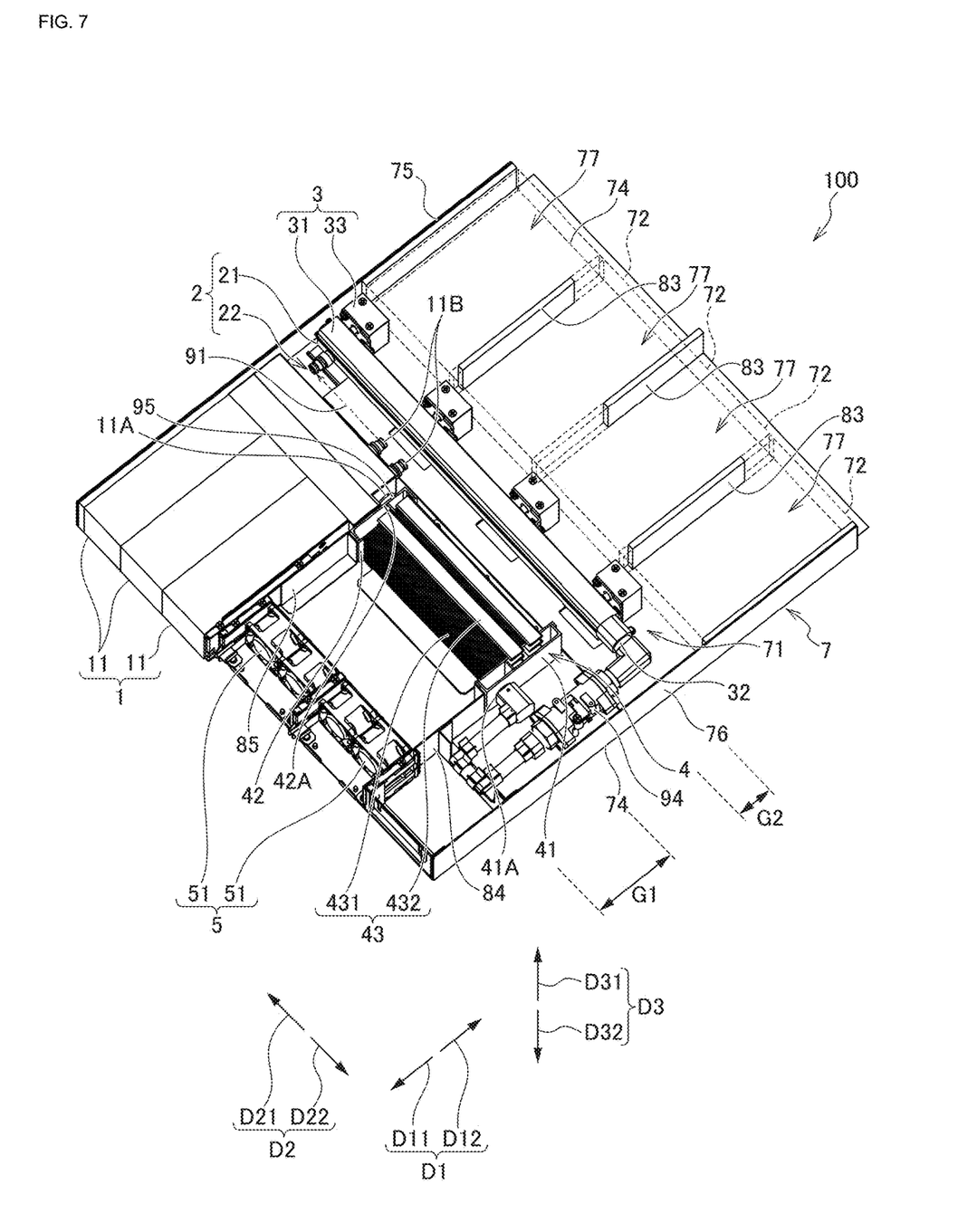
FIG. 7 is a lateral sectional view of the cooling assembly taken along line VI-VI shown in FIG. 5.

FIG. 2 is a perspective view showing the appearance of the cooling assembly 100 shown in FIG. 1. FIG. 3 is a perspective view showing the internal configuration of the cooling assembly 100 shown in FIG. 2. FIG. 4 is a perspective view of the internal configuration of the cooling assembly 100 shown in FIG. 3 as viewed from a viewing direction different from that of FIG. 3. FIG. 5 is a longitudinal sectional view of the cooling assembly 100 taken along line V-V shown in FIG. 4. FIG. 6 is a view showing the first manifold 2 and the second manifold 3 shown in FIG. 5. FIG. 7 is a lateral sectional view of the cooling assembly 100 taken along line VI-VI shown in FIG. 5.

As shown in FIGS. 2 to 7, the cooling assembly 100 further includes a housing 7 and a plurality of partition walls 8.

The housing 7 is an exterior body made of metal, for example. The outer shape of the housing 7 is a substantially rectangular cuboid shape. The housing 7 includes outer walls 73 to 76. The outer walls 73 to 76 define an internal space 71. In the example embodiment, the outer walls 73 and 74 are positioned at a distance in the third direction D3. The outer walls 75 and 76 are positioned at a distance in the second direction D2.

The housing 7 includes an opening 72 at an end on the other side D12 in the first direction (see FIG. 4, in particular). The opening 72 is continuous to the internal space 71. In the internal space 71, the plurality of partition walls 8, the pump unit 1, the two first manifolds 2, the two second manifolds 3, the radiator 4, and the air blower assembly 5 are arranged (see FIGS. 3 to 7, in particular).

The plurality of partition walls 8 include a first partition wall 81, a plurality of second partition walls 82, and a plurality of third partition walls 83 (see FIGS. 3 and 4, in particular).

The first partition wall 81 is positioned on the other side D12 in the first direction in the internal space 71. The first partition wall 81 is positioned between the outer walls 73 and 74 in the third direction D3. The first partition wall 81 has a plate shape that is thin in the third direction D3, and expands in the first direction D1 and the second direction D2.

The plurality of second partition walls 82 are positioned between the first partition wall 81 and the outer wall 73 (see FIG. 3, in particular). The plurality of second partition walls 82 have a plate shape that is thin in the second direction D2, and expand in the first direction D1 and the third direction D3. The plurality of second partition walls 82 are positioned at intervals in the second direction D2.

The plurality of third partition walls 83 are similar to the plurality of second partition walls 82 except that the third partition walls are positioned between the first partition wall 81 and the outer wall 74 (see FIG. 4, in particular).

The first partition wall 81, the plurality of second partition walls 82, and the plurality of third partition walls 83 partition the internal space 71 into a plurality of mounting spaces 77. A combination of the cold plate 61 and the heat source 62 (see FIG. 1) is mounted in each of the plurality of mounting spaces 77. When the cold plate 61 and the heat source 62 are mounted in each of the mounting spaces 77, a gap is formed between the cold plate 61 and the heat source 62 and the second partition wall 82 or the third partition wall 83. Due to this gap, the air flowing in from the opening 72 flows out toward the radiator 4.

The pump unit 1 is positioned at the end of each on the one side D11 in the first direction and the one side D21 in the second direction on the outer wall 74. The three pump units 11 included in the pump unit 1 are arranged side by side in the second direction D2.

Each of the first manifolds 2 is positioned between the pump unit 1 and the radiator 4 and the first partition wall 81 in the first direction D1 (see FIGS. 3 and 4, in particular). The two first manifolds 2 are positioned at a distance in the third direction D3 (see FIG. 5, in particular). Each of the first manifolds 2 extends along the second direction D2 between the outer walls 75 and 76.

It is preferable that the first manifolds 2 have the same specifications. It is preferable that at least the first pipes 21 of the first manifolds 2 overlap in the third direction D3 (see FIGS. 3 and 6, in particular). This suppresses the housing 7 from becoming large in size in each of the first direction D1 and the second direction D2.

The inflow port 22 of each of the first manifolds 2 is provided at a position close to the outer wall 75 of the outer walls 75 and 76 (see FIG. 7, in particular). Specifically, the positions of the inflow ports 22 in the second direction D2 are aligned with each other. This suppresses the length of the flow path 91 connecting the pump unit 1 and each of the first manifolds 2. In FIG. 7, the flow path 91 is indicated by a broken line.

Each of the outlet pipes 23 extends from the first pipe 21 toward the other side D12 in the first direction toward one mounting space 77.

Each of the second manifolds 3 is positioned between the pump unit 1 and the first partition wall 81 in the first direction D1 (see FIG. 7, in particular). The second manifolds 3 are positioned at intervals in the third direction D3 (see FIG. 6, in particular). Specifically, one of the second manifolds 3 is positioned between the two first manifolds 2 at an interval from each of the first manifolds 2 (see FIG. 6, in particular). The other of the second manifolds 3 is positioned between the other of the first manifolds 2 and the outer wall 73 of the housing 7 (see FIG. 5, in particular). Each of the second manifolds 3 extends along the second direction D2 between the outer walls 75 and 76.

It is preferable that the second manifolds 3 have the same specifications. It is preferable that at least the second pipes 31 of the second manifolds 3 overlap each other in the third direction D3 (see FIGS. 3, 6, and 7, in particular). It is preferable that the second manifolds 3 also overlap the respective first manifolds 2 in the third direction D3 (see FIGS. 6 and 7, in particular). This suppresses the housing 7 from becoming large in size in each of the first direction D1 and the second direction D2.

Specifically, the outflow port 32 of each of the second manifolds 3 is provided at a position close to the outer wall 76 of the outer walls 75 and 76. The positions of the outflow ports 32 in the second direction D2 are aligned with each other (see FIG. 7, in particular). This suppresses the length of the flow path 94 connecting each of the second manifolds 3 and the radiator 4.

Each of the inlet pipes 33 extends from the second pipe 31 toward the other side D12 in the first direction toward the one mounting space 77.

The radiator 4 is positioned away on the one side D11 in the first direction relative to each of the first manifolds 2 and the second manifolds 3 (see FIG. 7, in particular). That is, each of the first manifolds 2 and the second manifolds 3 is positioned on an upstream side of the airflow relative to the radiator 4. The upstream side of the airflow is the other side D12 in the first direction. The radiator 4 is positioned of the housing 7 away from the end on the one side D11 in the first direction to the other side D12 in the first direction. The radiator 4 is positioned between the outer walls 73 and 74 (see FIG. 5, in particular). In the first direction D1, a part of the radiator 4 opposes each of the first pipe 21 and the second pipe 31 (see FIG. 5, in particular). Therefore, the first pipe 21, the second pipe 31, and the radiator 4 are densely arranged in the internal space 71. As a result, the cooling assembly 100 is suppressed from becoming large in size. By rotation of the impeller of the air blower assembly 5, air flows into the internal space 71 from the opening 72. The air flows into between the first pipe 21 and the second pipe 31 via the mounting space 77 in the internal space 71. The air circulates through a space between the first pipe 21 and the second pipe 31 before being introduced between the plurality of flow paths 431 (that is, the ventilation path 433). Since each of the ventilation paths 433 is close to the first pipe 21 and the second pipe 31 on one side D11 in the first direction (that is, the air blower assembly 5 side), the air is efficiently guided from the first manifold 2 and the second manifold 3 to the ventilation path 433.

The first pipes 21 and the second pipes 31 are arranged at intervals in the third direction D3 (see FIG. 5, in particular). In the first pipe 21 and the second pipe 31, the width in the third direction D3 is smaller than ¼ of the width of the radiator core 43 in the third direction D3. As a result, a space through which air passes is secured between the first pipe 21 and the second pipe 31, and the air is efficiently introduced into the ventilation path 433 formed between the flow paths 431.

In the example embodiment, the housing 7 is provided with two sets of combinations of the first manifold 2 and the second manifold 3. Therefore, the cooling assembly 100 can cool a relatively large number of the heat sources 62. The first pipe 21 in each of the first manifolds 2 and the second pipe 31 in each of the second manifolds 3 oppose a part of the radiator 4 on the other side D12 in the first direction in a state of being arranged side by side at an interval in the third direction D3 (see FIGS. 3 and 4, in particular). Therefore, while the large number of heat sources 62 can be mounted in the housing 7, the volume of air passing through the ventilation path 433 is suppressed from decreasing.

The air blower assembly 5 is positioned at the end of the one side D11 in the first direction between the outer walls 73 and 74. Specifically, the air blower assembly 5 is positioned at a distance on one side D11 in the first direction from the radiator 4. Specifically, in the air blower assembly 5, four fan units 51 oppose the radiator core 43 on the one side D11 in the first direction on the other side D22 in the second direction relative to the pump unit 1. The remaining one fan unit 51 is positioned on the one side D31 in the third direction relative to the pump unit 1 on the one side D21 in the second direction relative to the four fan units 51. That is, it is preferable that in the second direction D2, a maximum dimension L1 of the air blower assembly 5 is larger than a maximum dimension L2 of the radiator 4 (see FIG. 3, in particular). As a result, the volume of air passing through the housing 7 increases.

A first straightening plate 84 is provided between the ends on the other side D22 in the second direction in each of the air blower assembly 5 and the radiator core 43. A second straightening plate 85 is provided between the ends on the one side D21 in the second direction in each of the air blower assembly and the radiator core 43. By rotation of each impeller of the five fan units 51, the air having passed through the ventilation path 433 of the radiator 4 passes through between the first straightening plate 84 and the second straightening plate 85 and is ejected to the outside of the housing 7.

In the air blower assembly 5, the four fan units 51 oppose the radiator core 43 in the first direction D1 (see FIGS. 3 and 4, in particular). Therefore, the air blower assembly 5 opposes at least a part of the radiator 4 in the first direction D1. The configuration of the cooling assembly 100 is not arranged between the radiator core 43 and the four fan units 51. That is, the ventilation resistance between the radiator 4 and the air blower assembly 5 can be made relatively small. Therefore, air is efficiently guided from the radiator core 43 to the air blower assembly 5.

In the example embodiment, the first manifold 2 and the second manifold 3 are positioned on the upstream side of the airflow relative to the radiator 4. The air blower assembly 5 is positioned on the downstream side of the airflow relative to the radiator 4. The upstream side and the downstream side of the airflow are the other side D12 in the first direction and the one side D11 in the first direction. That is, each of the first manifold 2 and the second manifold 3 is not arranged between the radiator 4 and the air blower assembly 5. Therefore, the first manifold 2, the second manifold 3, the radiator 4, and the air blower assembly 5 can be efficiently laid out.

As shown in FIG. 7, an interval G1 in the first direction D1 between the radiator core 43 and the air blower assembly 5 is wider than an interval G2 in the first direction D1 between the first pipe 21 and the second pipe 31 and the radiator core 43. Therefore, the air flowing out of the radiator core 43 can be cooled between the first straightening plate 84 and the second straightening plate 85 before being ejected from the air blower assembly 5 to the outside of the housing 7. Therefore, it is possible to suppress high-temperature air from being ejected to the outside of the cooling assembly 100.

The example embodiment of the present disclosure has been described above with reference to the drawings. However, the present disclosure is not limited to the above example embodiment, and can be implemented in various aspects without departing from the gist of the present disclosure. Additionally, the plurality of constituent elements disclosed in the above example embodiment can be appropriately modified. For example, a certain constituent element of all constituent elements shown in a certain example embodiment may be added to a constituent element of another example embodiment, or some constituent elements of all constituent elements shown in a certain example embodiment may be removed from the example embodiment.

The drawings schematically show each constituent element mainly in order to facilitate understanding of the present disclosure, and the thickness, length, number, interval, and the like of each constituent element that is shown may be different from the actual ones for convenience of the drawings. The configuration of each constituent element shown in the above example embodiment is an example and is not particularly limited, and it goes without saying that various modifications can be made without substantially departing from the effects of the present disclosure.

In the example embodiment, the cooling assembly 100 includes two sets of combinations of the first manifold 2 and the second manifold 3. However, the present disclosure is not limited to this, and the cooling assembly 100 only needs to include at least one set of the first manifold 2 and the second manifold 3. In a case of one set of the first manifold 2 and the second manifold 3, the widths in the third direction D3 of the first pipe 21 and the second pipe 31 are preferably smaller than ½ of the width in the third direction D3 of the radiator core 43.

In the example embodiment, the air blower assembly 5 is positioned on the one side D11 in the first direction relative to the radiator 4, i.e., on the downstream side. However, the present disclosure is not limited to this, and the air blower assembly 5 may be positioned on the other side D12 in the first direction relative to the radiator 4.

In the example embodiment, in the second direction D2, the maximum dimension L1 of the air blower assembly 5 is larger than the maximum dimension L2 of the radiator 4. However, the present disclosure is not limited to this, and the maximum dimension L1 in the second direction D2 may be equal to or less than the maximum dimension L2.

In the example embodiment, the interval G1 between the radiator core 43 and the air blower assembly 5 in the first direction D1 is larger than the interval G2 between each of the first pipe 21 and the second pipe 31 and the radiator core 43. However, the present disclosure is not limited to this, and the interval G1 may be equal to or less than the interval G2.

In the example embodiment, the heat source 62 is a component of the computer device. However, the heat source 62 may be any heat-generating equipment other than the components of the computer device.

In the example embodiment, the air blower assembly 5 includes the fan unit 51. However, the air blower assembly 5 may include a blower in place of the fan unit 51.

The cooling assemblies according to preferred embodiments of the present disclosure are suitable for cooling electronic equipment.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A cooling assembly connectable with a cold plate that comes into thermal contact with a heat source, the cooling assembly comprising:
    two first manifolds each including a first pipe and a plurality of outflow ports to cause a refrigerant having circulated through the first pipe to flow out from the plurality of outflow ports toward the cold plate;
    two second manifolds each including a plurality of inflow ports and a second pipe such that a refrigerant flowing from the cold plate into the plurality of inflow ports circulates through the second pipe;
    a radiator including a plurality of flow paths arranged side by side at intervals such that a refrigerant having circulated through the second pipe circulates through the plurality of flow paths; and
    an air blower assembly to generate an airflow flowing between the plurality of flow paths in a first direction perpendicular or substantially perpendicular to the plurality of flow paths; wherein
    each of the first pipe and the second pipe opposes a portion of the radiator in the first direction;
    a refrigerant having circulated through the second pipe included in each of the second manifolds circulates through the plurality of flow paths included in the radiator; and
    the first pipe included in each of the first manifolds and the second pipe included in each of the second manifolds oppose a portion of the radiator in the first direction.

2. The cooling assembly according to claim 1, wherein
    the first pipe included in each of the first manifolds and the second pipe included in each of the second manifolds are arranged side by side in a third direction perpendicular or substantially perpendicular to the first direction; and
    a width in the third direction of each of the first pipe included in each of the first manifolds and the second pipe included in each of the second manifolds is smaller than half of a width in the third direction of the radiator.

3. The cooling assembly according to claim 1, wherein
    the first pipe included in each of the first manifolds and the second pipe included in each of the second manifolds are arranged side by side in a third direction perpendicular or substantially perpendicular to the first direction; and
    the first pipe included in each of the first manifolds and the second pipe included in each of the second manifolds are arranged side by side at an interval in the third direction.

4. The cooling assembly according to claim 1, wherein the air blower assembly opposes at least a portion of the radiator in the first direction.

5. The cooling assembly according to claim 1, wherein
    the two first manifolds and the two second manifolds are positioned on an upstream side of the airflow relative to the radiator; and
    the air blower assembly is positioned on a downstream side of the airflow relative to the radiator.

6. The cooling assembly according to claim 5, wherein in the first direction, an interval between the radiator and the air blower assembly is larger than an interval between the first pipe included in each of the first manifolds and the radiator.

7. The cooling assembly according to claim 1, wherein
    the first pipe included in each of the first manifolds and the second pipe included in each of the second manifolds are arranged side by side in a third direction perpendicular or substantially perpendicular to the first direction; and
    in a second direction orthogonal to the first direction and the third direction, a maximum dimension of the air blower assembly is larger than a maximum dimension of the radiator.

* * * * *